Feb. 18, 1941.  F. A. WOOL  2,232,089
FRUIT CUTTING APPARATUS AND METHOD
Filed April 20, 1938  3 Sheets-Sheet 1
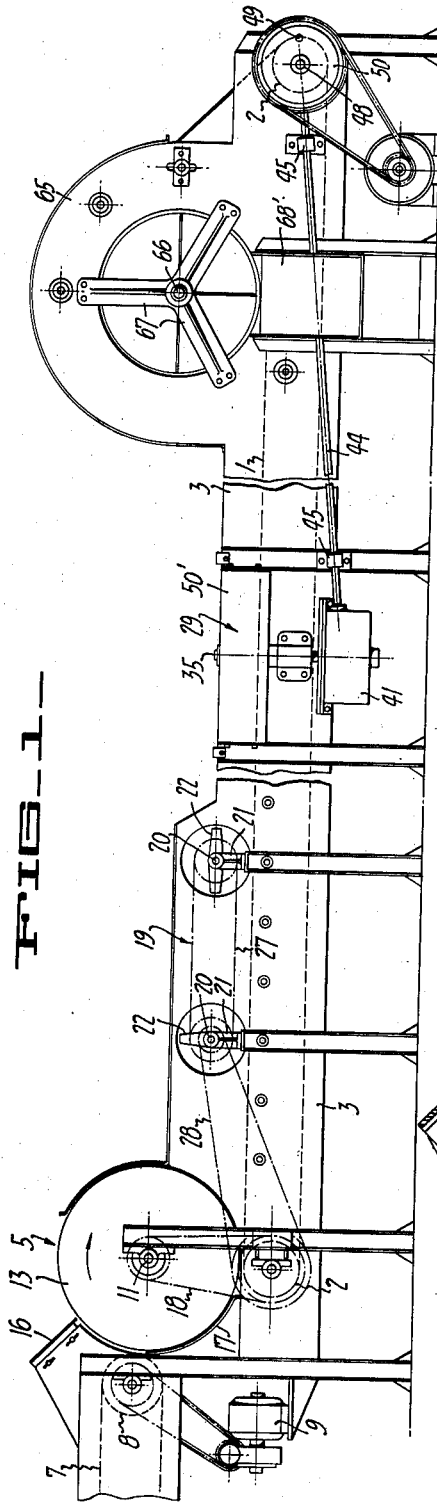
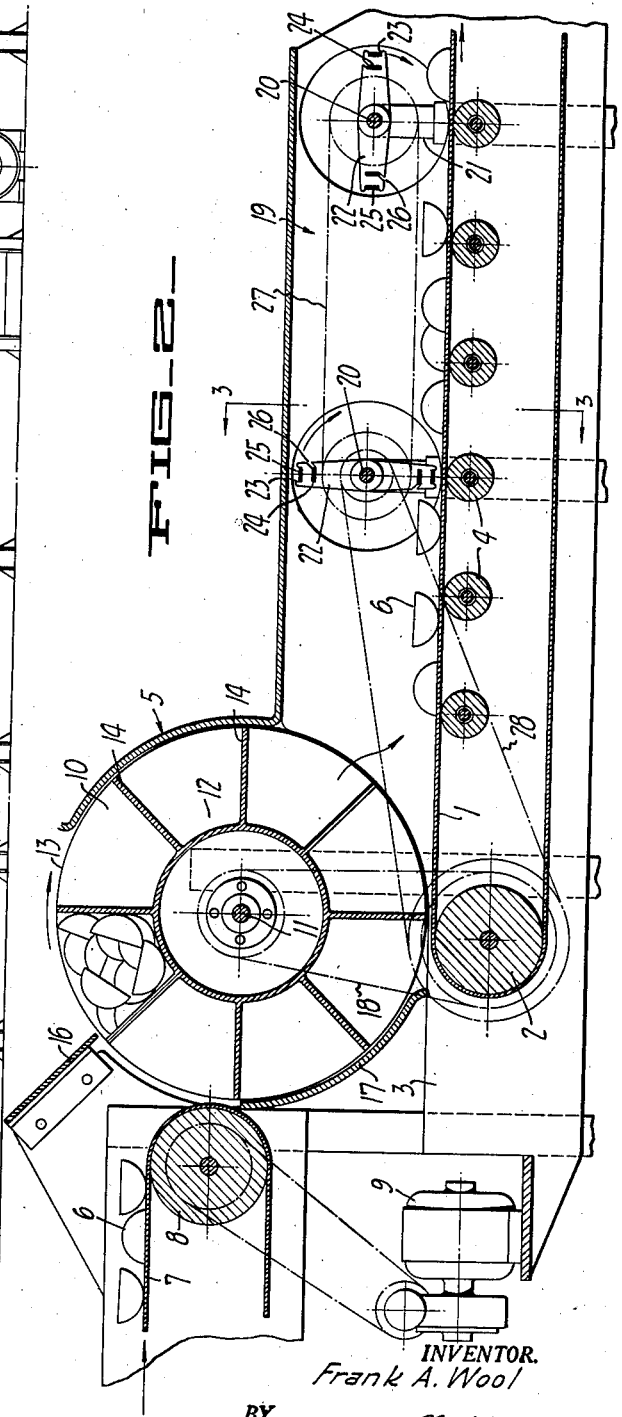
INVENTOR.
Frank A. Wool
BY
Boyken & Mohler
ATTORNEYS.

Feb. 18, 1941.  F. A. WOOL  2,232,089
FRUIT CUTTING APPARATUS AND METHOD
Filed April 20, 1938  3 Sheets-Sheet 2
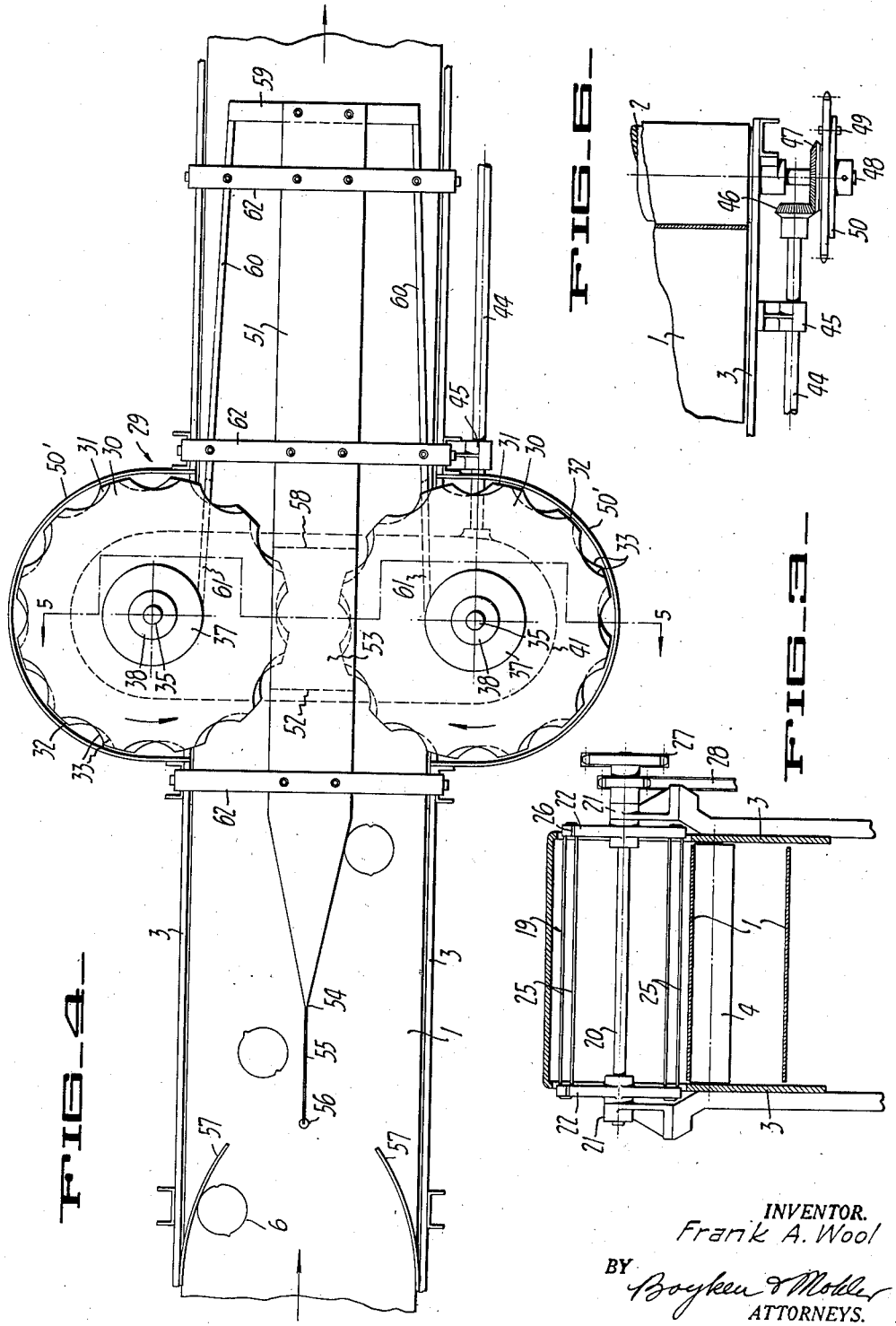
INVENTOR.
Frank A. Wool
BY
ATTORNEYS.

Feb. 18, 1941.  F. A. WOOL  2,232,089
FRUIT CUTTING APPARATUS AND METHOD
Filed April 20, 1938  3 Sheets-Sheet 3

INVENTOR.
Frank A. Wool
BY
ATTORNEYS.

Patented Feb. 18, 1941

2,232,089

UNITED STATES PATENT OFFICE 2,232,089

FRUIT CUTTING APPARATUS AND METHOD

Frank A. Wool, San Jose, Calif.

Application April 20, 1938, Serial No. 203,070

10 Claims. (Cl. 146—78)

This invention relates to apparatus and method for cutting fruit into pieces for canning or for such other use as may be desired, and has for one of its objects the provision of improved means for rapidly and cleanly cutting the fruit into pieces of the desired shape and size. Another object is improved means for arranging fruit halves, such as halves of pears, peaches, etc., with their flat, cut sides uniformly facing downwardly on a conveyor and with their convex sides uppermost. A still further object is improved means for distributing the fruit to be cut onto a conveyor to prevent objectionable piling up of the fruit on the conveyor. Other objects and advantages will appear in the description and drawings annexed hereto.

In the drawings,

Fig. 1 is a semi-diagrammatic side view of the apparatus with certain parts broken away and in section.

Fig. 2 is an enlarged view of a portion of the device of Fig. 1 shown partly in section.

Fig. 3 is a sectional view taken along the line 3—3 of Fig. 2.

Fig. 4 is an enlarged plan view of a portion of the apparatus shown in Fig. 1.

Fig. 9 is a sectional view along the line 9—9 of Fig. 8.

Figure 6:
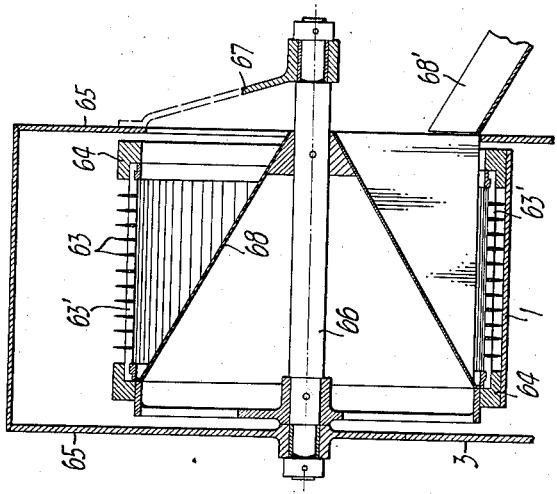
Fig. 6 is a fragmentary plan view of another portion of the apparatus.

Briefly, the apparatus shown in the drawings is generally of the type shown in my co-pending applications, Serial No. 107,442, filed October 24, 1936, and Serial No. 157,928, filed August 7, 1937, which became Patent No. 2,169,509 on August 15, 1939, in which fruit, vegetables, or the like, are carried on a conveyor along a path of travel and are cut into slices of uniform thickness, which I herein generally term "slabs" to distinguish over the ordinary radially cut slices of fruit. The slabs are carried to a dicing machine that cuts them into cubes or dice, and from the dicing machine the fruit may go into cans or be subjected to other treatment, as desired.

In detail the apparatus of this invention, as disclosed in the drawings, comprises a horizontally extending conveyor belt 1 supported at its ends on conventional pulleys 2 that may be revolvably mounted between spaced side frame members 3, between which members the upper run of belt extends with the frame members projecting above the side edges of the belt to retain the fruit thereon. Suitable idler pulleys 4 may also extend across below the upper run of belt 1 to support the same against sagging, particularly at points along the belt where other devices later described, perform operations on the fruit on said belt.

The fruit, which in this instance are halves 6 of peaches, pears or the like, are fed onto belt 1 by a measuring feed device generally designated 5 (Figs. 1, 2), and the fruit is fed to the measuring device 5 from another conveyor belt 7. The discharge end of belt 7 is positioned adjacent the device 5 and is mounted at one end on pulley 8 driven by a motor 9 with suitable reduction gears in the connection between the pulley and motor to drive the belt at proper speed.

The feed device 5 comprises an annular row of outwardly opening recesses 10 mounted centrally of the row on a shaft 11. The bottoms 12 of the receptacles are adjacent and around the shaft and two of the sides 13 are opposed circular plates centrally mounted on the shaft with the sides of the receptacles, other than plates just mentioned, comprising partitions 14 extending radially outwardly of bottoms 12.

The belt 7 may be driven from a connection between pulley 8 and one of the belt pulleys 2 or may be separately driven from the motor 9 through suitable reduction gearing, as described.

The discharge end of belt 7 is at slightly higher elevation than the shaft 11 and as the feed device 5 revolves on its axis the receptacles 10 thereof move past said discharge end and are successively filled, the limit of filling being controlled by an upper guard plate 16 extending across the device 5 and a lower guard plate 17 preventing any fruit from falling between the pulley and device 5.

The device 5 is revolved on its axis in the direction of the arrow by belt or chain connection 18 between a pulley on shaft 11 and pulley 2 and as the receptacles successively move to positions opening over belt 1, which extends therebelow, the measured batches of fruit in the receptacles successively drop onto belt 1, and also distributing the fruit on said latter belt, since the rate of surface speed of belt 1 is sufficiently fast to remove each batch from below the device 5 before the subsequent batch is discharged, and the falling of the fruit halves scatter them on said belt.

At a point over belt 1 and spaced therealong from the device 5, is a fruit turning device 19 for turning the flat cut sides (sometimes called cup sides), of the fruit halves face down on the belt with their outer convex sides uppermost. Heretofore the problem of turning the fruit over for further handling thereof, such as slicing, has been extremely difficult and guides, tubes, shakers, etc., have been attempted in an effort to solve the problem. In my apparatus, any fruit that comes to the turning device with the flat side down against the belt continues past the device without interruption, but any halves that are positioned with their flat sides up, are flipped over to reverse position before they pass said device and not until the flat sides are down will they pass.

This device comprises one or several horizontally extending shafts 20 spaced above and extending across the belt. The shafts are parallel and horizontally spaced, and each shaft is rotatably mounted in bearings 21 adjacent opposite ends (Fig. 3). Each of the shafts has centrally secured to its opposite ends a cross arm 22, and the opposite ends of the arms are formed with grooves 23 (Fig. 2), and openings 24, respectively, in horizontal alignment across the belt for supporting and passing the ends of endless rubber bands 25 therein and for spacing the opposed runs of the bands radially of the axis of shaft 20, the flat sides of said bands facing toward said axis. The bands are mounted on the ends of the cross arms by slipping the ends through slots 26 that open outwardly of the sides of the cross arms from openings. The outer runs of the bands 25, as they revolve about the axis of shafts 20 upon rotation of the latter, come relatively close to the belt 1, and they are revolved in the direction of the arrow (Fig. 2). Thus any fruit halves that are on the belt with their flat sides up, will be engaged below the flat side by the bands and will be flipped over to reverse position, while any halves that are face down on the belt are unaffected since the bands will stretch and slide over the upwardly facing convex surfaces of the halves. The shafts 20 are connected by a belt 27 for rotating in the same direction, and a belt 28 connects one of the shafts with the conveyor pulley 2 for operation thereof. Said shafts 20 rotate relatively fast to prevent any halves from passing below the bands 25 while the latter are in a horizontal plane and the pair of shafts with cross arms and bands is to insure against the possibility any halves passing the bands 25 without being turned, as might occur where a smaller half face up on the belt is alongside a larger half that is face down and passes the first set of bands, however the device is satisfactory with only one set of bands.

Figure 5:
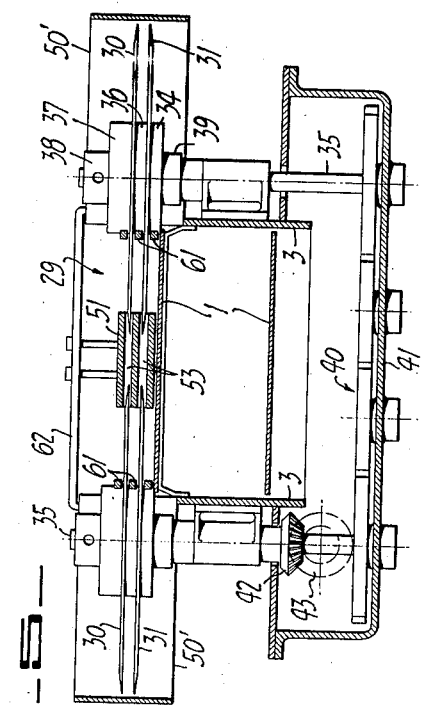
Fig. 5 is a sectional view of the portion shown in Fig. 4 as seen from line 5—5 of Fig. 4.

After the halves are turned face down on belt 1 they are carried to a cutting means generally designated 29 (Figs. 1, 4, 5) for cutting into slices of uniform thickness.

This cutting means comprises a pair of horizontal, superposed, axially aligned, vertically spaced, generally circular knives 30, 31 disposed at opposite side edges of the belt with the adjacent portions of the knives of each pair overlying the belt. Knives 30 are the upper knives of each pair and knives 31 are the lower knives. Knives 30 are in the same plane and knives 31 are in a common plane below knives 30, said planes being parallel with the plane of the belt 1. The spacing between knives 31 and the belt is equal to the spacing between knives 31 and 30, which spacing is equal to the desired thickness of the ultimate fruit dice.

The peripheral edges of the knives are provided with relatively wide teeth 32, the outer end edges of said teeth following the circumferential outline of the knives respectively and are elongated in the plane of the knives. Between the teeth the edges 33 of the knives curve inwardly and generally follow arcs defined about centers disposed around each knife outwardly of the peripheral edge thereof. The outer end edges of the teeth meet the curved edges between the teeth at angles to facilitate the knives entering fruit to be cut.

The knives of each pair are beveled along the sides of the teeth and the curved portions therebetween on the opposite outwardly facing sides of the knives only so that cutting edges are formed around each of the knives, which cutting edges are disposed along the planes of the opposed adjacent surfaces of the knives. This feature is highly important since it prevents wedging of fruit between the knives of each pair.

The spacing of the knives of each pair is accomplished by a disk 34 on shaft 35 positioned below knife 31 to space said knife the desired distance above belt 1. Between knives 30, 31 is a disk 36 spacing the knives, and a clamping disk 37 is over the upper knife, the knives and disks being clamped together between nut 38 engaging disk 37 and a washer 39, below the disks. Simultaneous rotation of both pairs of disks in the direction of the arrow is effected by means of a chain of gears 40 connecting across between shafts 35, one of the gears 40 being secured on each shaft and a pair of intermediate power transfer gears on support 41 connecting between the gears on the shafts. One of the shafts 35 also carries a bevel gear 42 which meshes with a bevel gear 43 on one end of a shaft 44, which shaft is rotatably mounted on and extends along one of the side frame members 3 to adjacent end pulley 2. Suitable bearings 45 mount the shaft on the frame members. At the end of shaft 44 adjacent pulley 2, the shaft carries a bevel gear 46 which meshes with a bevel gear 47 on pulley shaft 48. The gear 47 is connected for rotation with shaft 48 by means of a shear pin 49 engaging in registering apertures in a side of the gear and in a disk 50, the gear 47 being rotatable on the shaft 48 except for the connection through the shear pin with disk 50, the disk being keyed to the shaft. Thus in the event of a pit or relative hard foreign substance engaging the knives, the resistance to cutting thereof causes the shear pin 49 to be sheared off thereby stopping the rotation of the knives and preventing injury to the knives as well as affording opportunity to remove the pit or substance.

A guard 50' extends around such pair of knives themselves for protection against accidental cutting of the operator and also to protect the knives against being struck by objects that might injure them.

Centrally of belt 1 and over the same, I provide an elongated bar 51 that extends longitudinally of said belt, and commencing at about point 52 the bar is formed with horizontally extending slots 53 extending from said point in the direction of movement of the belt. The slots 53 receive therein the adjacent edges of the knives 30, 31 and the edges of the knives extend into said slots to substantially the depth of the teeth so that fruit passing by the knives and along the sides of the bar facing said knives, will be completely severed into slabs. (Figs. 4, 5).)

The end of the bar 51 facing toward the oncoming fruit on belt 1 converges to an apex at 54 and a thin vertically disposed sheet metal strip 55 extends forwardly from the apex toward the oncoming fruit, terminating in a rounded edge 56 at its forward end to prevent injury to the fruit. Spring strips 57 at the sides of the frame members 3 and forwardly of the bar 51 extend over the belt to direct the fruit halves generally toward the center of the belt so as to guide the fruit to positions alongside opposite lateral sides of bar 51.

The portions of bar 51 at opposite sides of the slot therein for the lower knife terminate at point 58 (Fig. 4), but the upper portion continues rearwardly and is connected at its rear end to a cross bar 59 which cross bar carries at its ends horizontally extending bars 60 that extend toward the knives. Said bars 60 are horizontally slotted at their ends adjacent the knives to provide portions 61 (Fig. 5) at opposite sides of the knives, the forward ends of said portions being beveled to substantially rest against the edges of disks 34, 36, 37, for stripping from between the knives any pieces of fruit that may tend to become lodged therebetween. The bars 60 extend convergently from their slotted forward ends for guiding the cut fruit toward the center of the belt so as to position the fruit on the belt to positively insure cutting of the slabs into dice by apparatus later described.

Cross bars 62 support bars 51, 60 over the belt, said cross bars being secured to the side frame members 3 of the apparatus.

Figure 7:
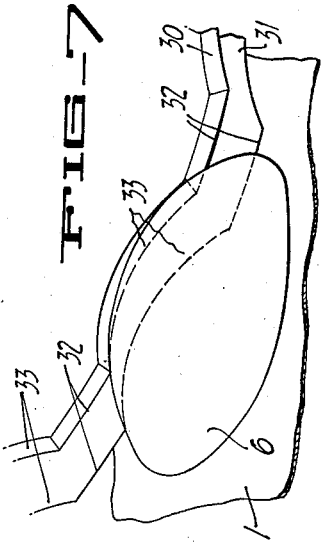
Fig. 7 is a fragmentary, enlarged perspective view showing part of the cutting device shown in Fig. 4.

Returning again to the knives, it is to be noted that the teeth of knives 30 are offset horizontally relative to the teeth on lower knives 31, the degree of offset being approximately that which will enable the adjacent teeth to effect a simultaneous cutting engagement with the fruit halves 6 as best indicated in Fig. 7, taking into consideration the degree of curvature of the convex sides of the halves. If the teeth were directly opposite each other, the teeth on the lower knife would cut into the fruit an appreciable time before the teeth of the upper knife engaged the fruit, whereas by the offset, the blades commence cutting at about the same time. Thus the fruit is steadied at the commencement of the cut and the small uppermost slice is carried clear of the lower knife before the lower slab is severed from the half. Also the curvature of the knife edges between the teeth is relatively flat so that the teeth will slice through the fruit rather than "saw" through the same.

The relatively obtuse, but decided corner at the junction with the ends of the teeth and curved edges functions to quickly and positively engage the halves and to draw the halves toward bar 51 at the commencement of the cut. As the fruit halves are being cut, their speed of movement is slightly checked at first by the resistance of frictional engagement with the bar 51, but as soon as the fruit moves about half way past the knives, the resistance decreases and the speed of the fruit is accelerated to the point where the severed slabs are practically thrown from the knives and are distributed on the belt beyond the knives in a single layer of slices or slabs. The knives, of course, operate at a higher rate of speed than the belt 1, so as to actually slice the fruit by virtue of their own speed rather than by any "drawing" of the fruit by the belt past the knives.

Various types of knives, with and without teeth have been tried, both with both sides beveled and with the inner opposed sides beveled, but without success, particularly in cutting pears, which are easily torn and mutilated. But with the knives as described, the pear halves are sliced cleanly without waste or mutilation and without jamming between the knives. It is, of course, obvious that more or less than one pair of knives may be used in superposed relation, as in slicing pineapple or larger fruits.

After the fruit halves are reduced to slabs by the cutting device described, they pass in a layer of single thickness to the dicing device, which is similar to that shown in my co-pending application, Serial No. 157,928, filed August 7, 1937, and comprises a horizontal row of spaced annular knives 63 connected by equally spaced straight cross knives 63', arranged in an annular row, the knives being sharpened on their radially outwardly facing edges relative to the axis of the annular knives.

Figure 8:
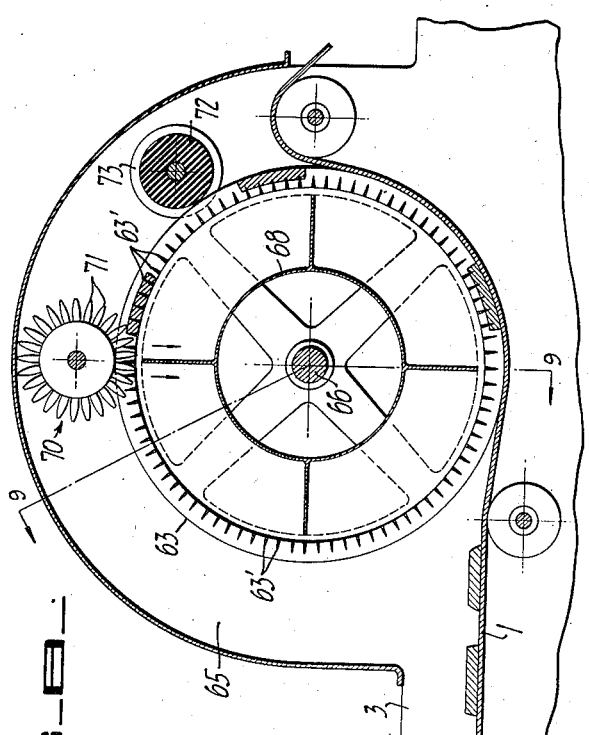
Fig. 8 is an elevational view, partly sectional, of the dicing element of my device.

The cross knives 63' are supported at their ends on annular rings 64, substantially as shown in said co-pending application, but instead of supporting the rings on rollers at points around the supporting frame sides 65, I provide a central shaft 66 axially disposed relative to the annular knives, which shaft carries spider arms 67 at its ends supported at their outer ends on the frame sides and the diced fruit is forced radially inwardly through the spaces defined by adjacent pairs of annular and cross knives to fall onto a tapered chute 68 supported on the rings, said chute opening outwardly of a side of the frame for discharging the fruit onto a stationary chute 68' for conveying the dice to a receptacle or other conveyor for subsequent canning, mixing, or other treatment as may be desired. Also in this device, the roller-like member 70 (Fig. 8) formed on its peripheral sides with projections 71 adapted to extend into the spaces between adjacent pairs of dicing knives for cutting by and ejection of the fruit from the knives is driven by the knife assembly itself, the projections meshing in the openings in the same manner as gears will mesh. Between the point where belt 1 leaves the knives and the roller 70 is a roller 72 that is merely grooved to receive the annular knives, as at 73, and which roller is of relatively soft rubber and contacts knives 63 in the bottom of the grooves for driving the roller by said knives. The rollers 70, 72 are rotatably mounted at their opposite ends in bearings carried by the stationary side frame.

From the foregoing description the manner of operation is obvious, the fruit halves being fed to measuring device 5 which successively dumps the measured batches onto belt 1 where the fruit turning device 19 turns all of the halves with their flat, cut sides down. The fruit thus positioned passes the cutting device 29 where knives 30, 31 cut them into slabs, and from said knives the slabs pass to the dicing apparatus that cuts the slabs into dice.

While saws, as described in my co-pending application, Serial No. 157,928, will cut the fruit into slabs, these saws tend to vibrate and to ultimately break, and the present arrangement of generally circular knives and teeth thereon completely overcomes this difficulty without reducing the capacity of the machine for handling the fruit. Also, a fruit turning device adapted to turn rapidly moving fruit halves without removal from the belt and without injury to the fruit is necessary to maintain a satisfactory volume of fruit passing through the device.

The improvements thus incorporated in the present machine are designed to provide fast, automatic, accurate handling of the fruit halves from the time they are indiscriminately dumped onto a conveyor belt until they are diced, and to accomplish this result without waste or mutilation of the fruit. Since pears are one of the most difficult fruits to handle satisfactorily, the present machine has been developed toward dicing pears, inasmuch as a machine capable of handling pears will take care of practically any fruit, but one that will take care of other fruits will not necessarily handle pears.

Having described my invention, I claim:

1. In apparatus of the character described, a generally horizontally extending conveyor for supporting fruit units or the like thereon for generally horizontal movement thereon along a path of travel, means for actuating said conveyor to cause said movement, means for cutting the units into slabs comprising a pair of generally circular, relatively thin knives co-axially disposed in generally horizontal vertically spaced planes with a portion of the knives extending over said conveyor and across said path of travel, means for rotating said knives on their axes in a direction to cause the portion overlying said conveyor to move in the direction of movement of the conveyor, said knives being formed with cutting teeth around their peripheral edges with the teeth of the lower knife offset horizontally relative to the teeth of the upper knife and the opposite outwardly facing sides of the pair of knives at their peripheral edges including the said cutting edges of the teeth being beveled to form sharpened edges, the inner opposed surfaces of the knives including the teeth being straight at the peripheral edges of the knives.

2. In a construction as defined in claim 1, an elongated guide member disposed over the conveyor and extending longitudinally of said path and past said knives, said member being formed with spaced outwardly opening recesses adapted to receive and to pass the teeth of said knives upon rotation of the knives, and means mounting said member in position to receive said teeth whereby the units on the conveyor will be guided by the member to the teeth for cutting by the latter prior to the teeth entering said recesses.

3. In apparatus of the character described, a generally horizontally extending conveyor for supporting fruit units or the like thereon for generally horizontal movement along a path of travel, means for actuating said conveyor to cause said movement, means for cutting the units into slabs comprising a pair of generally circular superposed, coaxially arranged, vertically spaced, generally horizontal, knives positioned on each side of the conveyor in opposed relation and with the knives of corresponding elevation in the same plane, adjacent portions of the pairs of knives being disposed over said conveyor to intercept and cut the fruit during movement of the latter along said path, means for simultaneously rotating said pairs of knives arranged to cause the portions thereof overlying the conveyor to move generally in the direction of movement of the conveyor, the adjacent edges of said pairs of knives being spaced apart and a guide member disposed between the pairs of knives recessed to receive the margins of the knives, said guide member being elongated in the direction of movement of the units for directing units on the conveyor to one or the other of the pairs of knives, and the knives of each pair being formed with teeth around their peripheral edges, said teeth being sharpened in the plane of the knives.

4. In a construction as defined in claim 3, means between the knives of each pair arranged and adapted to extend divergently outwardly from each other in the direction of movement of the units for stripping cut slabs from between the knives.

5. In a construction as defined in claim 3, the teeth of the uppermost knife of each pair being offset horizontally relative to the teeth of the lowermost knife of each pair.

6. The method of dicing fruit comprising the steps of supporting a plurality of indiscriminately arranged fruit halves for continuous movement at a uniform rate of speed along a substantially horizontal path of travel in one direction only and so moving said halves, engaging the advanced, convex, generally forwardly and downwardly facing sides of fruit halves that are disposed with their convex sides lowermost, and with their flat, cut-sides uppermost, and flipping such halves rearwardly and upwardly relative to the direction of movement of the halves along said path to thereby turn the halves over with their flat sides lowermost while permitting the halves that are positioned with their cut sides lowermost to move in said one direction without interruption, thereafter cutting said halves horizontally across during said movement in said one direction to produce horizontal fruit disks, and finally in one operation, cutting said disks in direction transversely of the respective planes thereof into dice while said disks are moving at said uniform rate of speed.

7. In combination, a movable conveyor arranged and adapted to carry a plurality of fruit units along a generally horizontally extending path of travel in one direction upon actuation thereof, means for actuating said conveyor for carrying said units along said path, a horizontally disposed, rotary, disk-like, generally circular knife with sharpened peripheral edges positioned with a portion thereof extending over said conveyor and in the path of said fruit units for cutting said units into slices of substantially uniform vertical thickness upon said units being carried past said knife, means for rotating said knife on its central vertically extending axis, and a single, rotary cutting device positioned over said conveyor at a point beyond said knife arranged and adapted to cut said slices in the direction of said thickness into cubes upon said slices being carried to said device by said conveyor.

8. Apparatus for dicing fruit that comprises, an endless, generally horizontally extending conveyor belt arranged and adapted to carry a plurality of fruit halves on the upper run thereof for continuous movement of said halves in one general direction, means for actuating said belt for causing said movement, separate, rotary cutters positioned above and over said upper run at spaced points along the length of said run respectively arranged and adapted to cut said halves into slices of substantially uniform thickness and to substantially cut said slices into cubes of substantially uniform dimensions during said movement, means for actuating said cutters for so cutting said halves into said slices and said cubes, and means supporting said cutters in positions for cutting engagement with the fruit upon actuation of said cutters and while the fruit is supported on the upper run of said belt during said movement.

9. Apparatus for dicing fruit that comprises an endless, generally horizontally extending conveyor belt arranged and adapted to carry a plurality of fruit halves, such as halves of peaches or the like, on the upper run thereof for continuous movement of said halves in one general direction, means for actuating said conveyor for so carrying said fruit halves, means for feeding said halves onto said run at a point therealong, separate, power-driven means at spaced points along the length of said run and beyond said first mentioned point in the direction of movement of said run, said separate means being positioned above and over said run and arranged and adapted to turn the halves that are disposed with their flat faces upward to positions with the said flat faces downward against said run and to cut such halves in a plane parallel with the planes of said flat faces into slices of substantially uniform thickness and to substantially cut such slices into cubes of substantially uniform dimensions during said movement while the fruit is supported on said belt, and power means for driving said separate means.

10. A machine for cutting fruit units into cubes comprising, in combination, an endless, generally horizontally extending conveyor belt arranged and adapted to carry a plurality of fruit units on the upper run thereof for continuous movement of said units in one general direction, means for actuating said belt for causing said movement, separate, power-actuated means positioned above said run at spaced points along the length thereof respectively arranged and adapted to substantially continuously feed said units on said run at a predetermined quantity per minute for carrying by said run in said continuous movement, and to cut the units so fed and carried by said run into slices of substantially uniform thickness, and to cut such slices, while supported on and carried by said run, into cubes of substantially uniform dimensions during said movement, and power means for simultaneously actuating said separate means with respect to each other and with respect to the means for actuating said belt.

FRANK A. WOOL.